United States Patent
Walker et al.

(10) Patent No.: US 7,679,007 B1
(45) Date of Patent: Mar. 16, 2010

(54) MODULAR IN-WALL MEDICAL SERVICES UNIT WITH INTERNAL RACEWAYS

(75) Inventors: James A. Walker, Oklahoma City, OK (US); John R. Pierson, Guthrie, OK (US)

(73) Assignee: Modular Services Company, Oklahoma City, OK (US)

( * ) Notice: Subject to any disclaimer, the term of this patent is extended or adjusted under 35 U.S.C. 154(b) by 0 days.

(21) Appl. No.: 11/771,284

(22) Filed: Jun. 29, 2007

(51) Int. Cl.
*H05K 5/00* (2006.01)
*H02G 3/22* (2006.01)

(52) U.S. Cl. .................. 174/481; 174/480; 174/64; 439/532; 439/107; 200/43.8; 52/220.1; 211/26

(58) Field of Classification Search .......... 174/53, 174/47, 480, 481, 72 A, 64, 501, 506; 439/107, 439/716, 532, 536; 200/43.8; 52/220.1, 52/220.7, 220.8; 211/26
See application file for complete search history.

(56) References Cited

U.S. PATENT DOCUMENTS

| | | | |
|---|---|---|---|
| 3,692,920 A * | 9/1972 | Santarelli | 174/501 |
| 4,338,485 A * | 7/1982 | Fullenkamp et al. | 174/501 |
| 5,247,962 A | 9/1993 | Walker | |
| 5,448,859 A * | 9/1995 | Walker et al. | 52/38 |
| 5,644,876 A | 7/1997 | Walker | |
| 5,784,841 A * | 7/1998 | Nowell | 52/220.5 |
| D443,365 S | 6/2001 | Walker | |
| 6,256,935 B1 | 7/2001 | Walker | |
| 6,269,594 B1 | 8/2001 | Walker | |
| D452,573 S | 12/2001 | Walker | |
| D472,325 S | 3/2003 | Walker | |
| 6,668,493 B1 | 12/2003 | Walker | |
| 7,204,714 B2 | 4/2007 | Walker et al. | |
| 7,549,893 B1 | 6/2009 | Walker et al. | |
| 2003/0177713 A1 | 9/2003 | Walker et al. | |
| 2004/0231248 A1 | 11/2004 | Walker et al. | |

FOREIGN PATENT DOCUMENTS

| | | |
|---|---|---|
| CA | 2392270 | 9/2003 |
| CA | 2467300 A1 | 11/2004 |
| MX | PA/A/2004/004613 A | 8/2005 |
| MX | 262578 | 11/2008 |

* cited by examiner

*Primary Examiner*—Dhiru R Patel
(74) *Attorney, Agent, or Firm*—Mary M. Lee

(57) ABSTRACT

A modular in-wall medical services unit for medical care facilities. A housing is supported inside the wall. The housing is divided longitudinally into front and rear chambers. The service outlet cabinet and gas conduits are mounted in the front chamber. The rear chamber is divided into multiple raceways for the electrical wires. The top of the housing is above the ceiling, and a junction box is mounted on the front of the housing near the top so that it extends beyond the wallboard and above the ceiling. This allows the wallboard to be installed around the cabinet and the junction box before or after gas and electrical connections are completed. Because there are no external wiring conduits, the unit is easier to ship. Additionally, the narrow footprint allows the unit to be placed adjacent another structure in the wall or in a corner, increasing the placement choices in the room.

16 Claims, 4 Drawing Sheets

MODULAR IN-WALL MEDICAL SERVICES UNIT WITH INTERNAL RACEWAYS

FIELD OF THE INVENTION

The present invention relates to devices for providing medical gas and electrical services to hospitals and other medical care facilities.

BACKGROUND OF THE INVENTION

Construction costs for hospitals and other medical care facilities depend in part on the cost of required medical equipment as well as the efficiency of installation of such equipment during the construction phase. One major item installed in most patient care areas is a wall panel for providing medical gases and electrical and data services at the bedside. Modular units have greatly simplified installation.

The present invention provides an advance in modular medical services units for in-wall applications. In this unit, electrical raceways are provided behind the main cabinet, and these raceways extend up above the ceiling preferably to a junction box in the ceiling space. The internal raceways eliminate the need for external wiring conduits and provide a consolidated unit for shipping. The narrower footprint allows the assembled unit to be installed in smaller places, next to other wall fixtures, and in corners.

DETAILED DESCRIPTION OF THE PREFERRED EMBODIMENT

Figure 1:
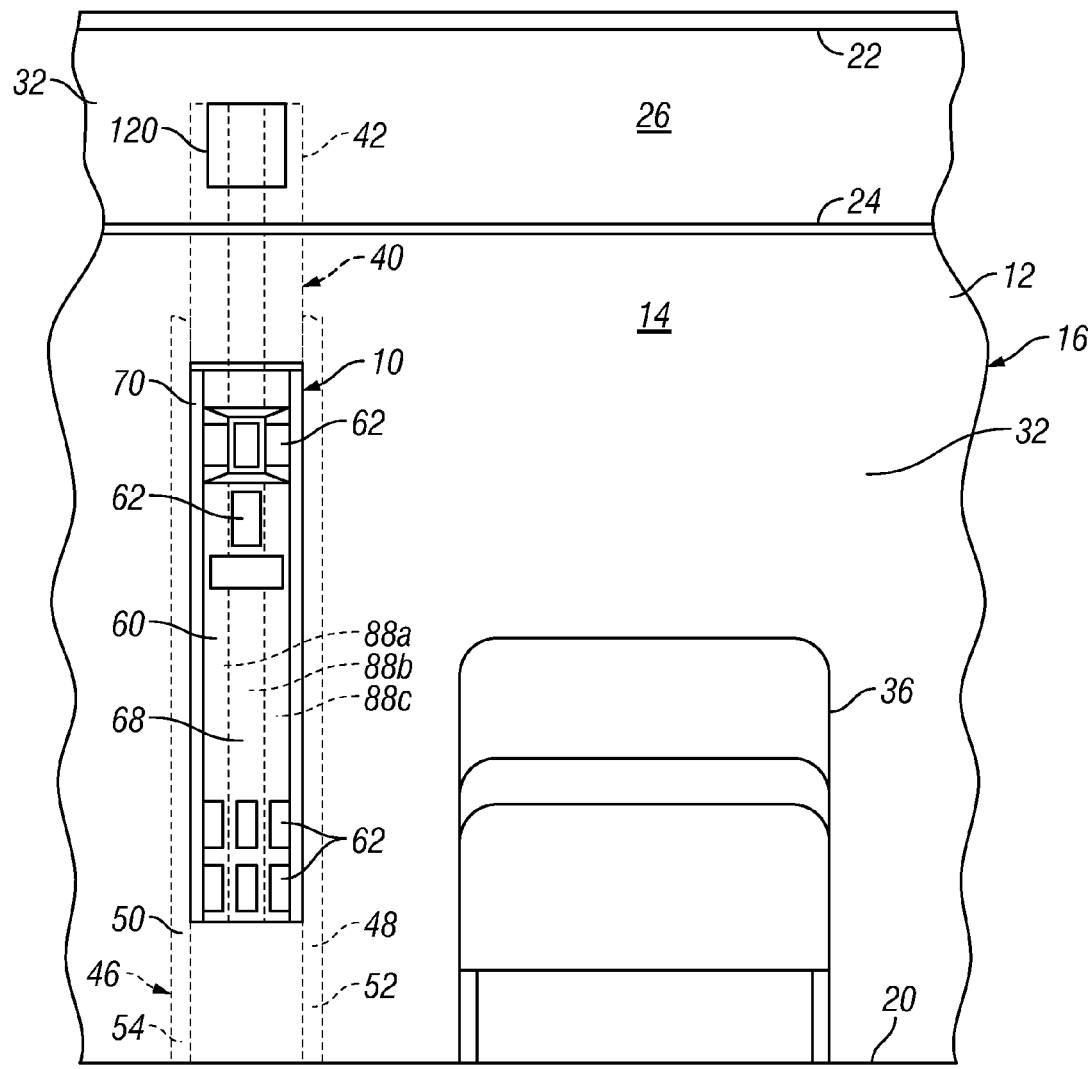
FIG. 1 is an elevational, fragmented view of hospital room showing the modular medical services unit of the present invention installed in the wall near a bed.
Figure 4:
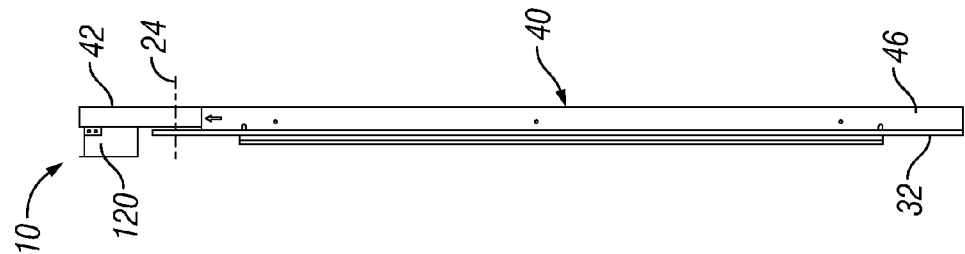
FIG. 4 is a side elevational view of the unit shown in FIG. 2.
Figure 3:
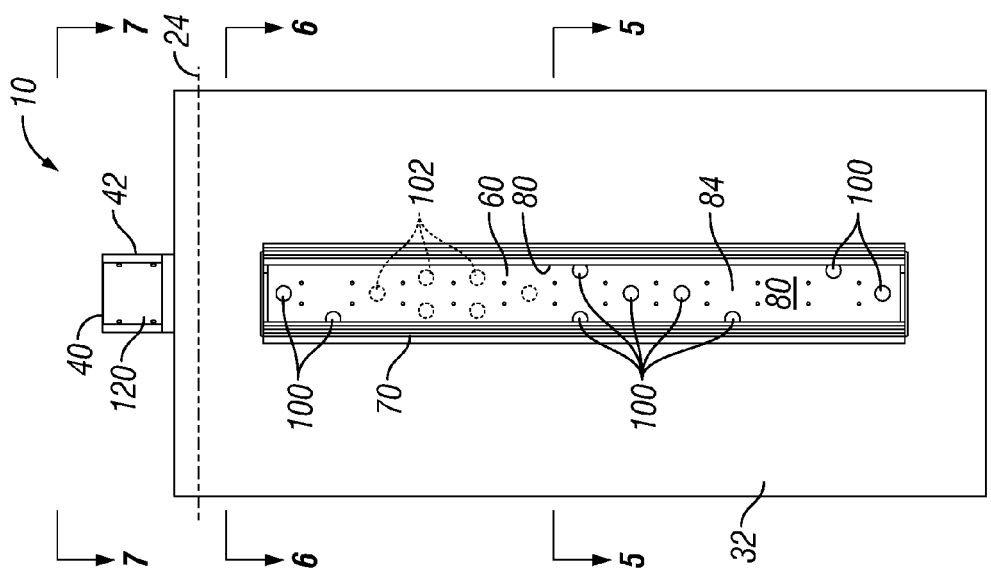
FIG. 3 is a front elevational view of the unit shown in FIG. 2.
Figure 2:
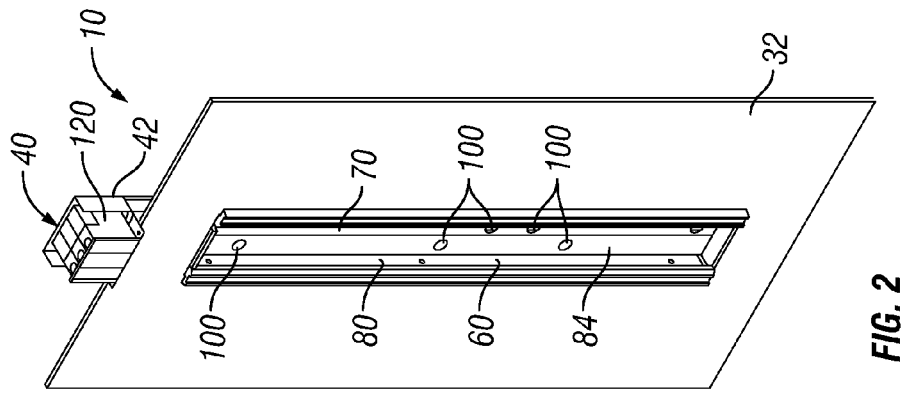
FIG. 2 is a perspective view of the unit with the cover panel removed and with a section of wallboard surrounding the cabinet opening.

Turning now to the drawings in general and to FIG. 1 in particular, there is shown therein a modular in-wall medical services unit constructed in accordance with the present invention and designated generally by the reference numeral 10. As used herein, "medical service" or "service" refers to any one of a variety of gas, electrical or communication services. For example, medical gas services include oxygen, compressed air, and vacuum (suction). Electrical services include electrical power lines and data lines for telephone, video, computer, or communication signals. As used herein, "wires" include power lines and data cables.

The unit 10 is illustrated installed in the wall 12 of a room 14 in a structure 16. In a multi-floor structure, such as most hospitals, the room 14 generally is defined horizontally the floor 20 beneath and a deck 22 above. A ceiling 24 is usually mounted a distance of about 2-3 feet below the deck 22 defining what is referred to herein as a ceiling space 26 (FIG. 1). The wall 12, which at least partially defines the room 14, vertically comprises a wall space 30 (FIGS. 5-7) defined on the inside of the room by wallboard 32.

Usually, the unit 10 will be installed at the side of a patient bed 36. While a conventional hospital room 14 is depicted, the unit 10 may be installed in a variety of structures such as clinics, emergency rooms, nursing home rooms, and virtually any sort of treatment facility. Moreover, it will be understood, that in a single-story structure such as small clinic, the deck 22 may be replaced by a roof structure of some sort.

With reference now also to FIGS. 2-7, the unit 10 is adapted for installation in the wall space 30 defining the room 14. To that end, the unit 10 comprises an elongate housing 40. Typically, the housing 40 will be generally tubular, that is, comprising an enclosure formed by sidewalls. The housing 40 may be formed in any suitable manner as by assembly of multiple panels, or by extrusions, or by a combination of these techniques.

The housing 40 preferably is narrow enough to fit between studs in a typical building structure. The length of the housing 40 may vary, but it should be long enough to support the medical service outlets (described below) at desired locations in the room 14 and to have its upper end 42 extend above the ceiling 24 into the ceiling space 26.

The housing 40 is supportable inside the wall space 30. For this purpose, a frame 46 may be included. Preferably, the frame 46 may comprise a pair of C-shaped or U-shaped rails 48 and 50, one on each side of the housing 40. As seen best in FIG. 1, the rails have bottom ends 52 and 54 adapted to rest on the floor 20 of the room 14.

Figure 8:
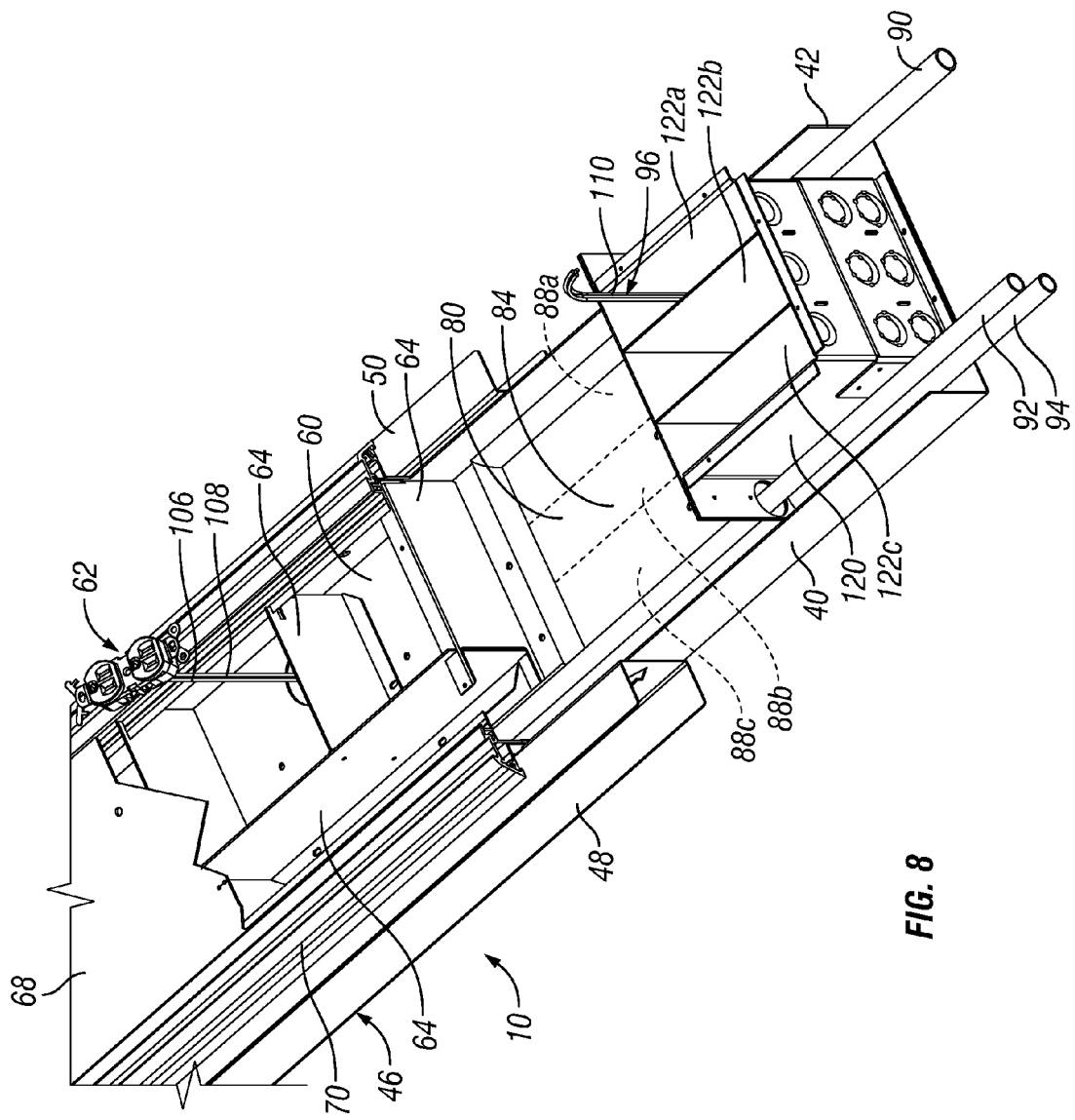
FIG. 8 is a fragmented perspective view of the unit with the front of the housing removed and a part of the cover panel cut away to show the gas conduits and compartments inside.

A cabinet 60 is included in the unit 10 for containing the outlets for the various medical services that are selected to be included in the unit. Typically, the number, type and arrangement of the outlets are specified by the customer and will vary depending on the setting or the type of facility, and the cabinet 60 will vary accordingly. To simplify the disclosure, all the outlets will be designated herein collectively by the reference numeral 62. The cabinet 60 may be a separately formed enclosure or, more conveniently it may be formed by placing partitions, designated generally at 64, inside the housing 40, as best seen in FIG. 8. Of course, though the size and position of the cabinet 60 may vary, it will be positioned so that when the unit 10 is installed, it will be below the ceiling 24 and support the outlets 62 at a convenient height for the medical personnel. It will also be apparent that the unit 10 could include more than one cabinet. For example, the unit could include two or more cabinets spaced vertically in the housing 40.

A shown in FIGS. 1 and 8, the cabinet 60 preferably will be enclosed on the front with a cover panel 68 that forms the interface between the room 14 and the inside of the cabinet 60. The housing 40 will be structured so that it can be installed with the cover panel 68 about flush with the wallboard 32. Alternately, the housing 40 may be installed so that the cover panel 68 is slightly forward of the wallboard 32 or slightly recessed behind the wallboard. A decorative trim and flange assembly 70 will usually be included to provide an interface between the upper outer edge of the cabinet 60 and the raw edge of the surrounding wallboard 32 when the unit 10 is installed.

As indicated previously, the outlets 62 most often will include an assortment of outlets for medical gases (oxygen, air, vacuum) and electrical services (power and data). In the present invention, the outlets 62 most preferably include at least one and most preferably a plurality of electrical service outlets, one of which is shown in detail in FIG. 8 as a power outlet.

Figure 5:
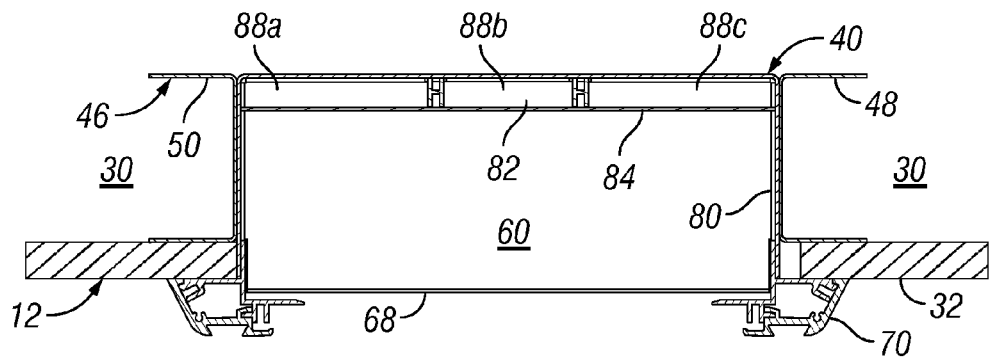
FIG. 5 is cross-sectional view of the unit take along line 5-5 of FIG. 3.
Figure 6:
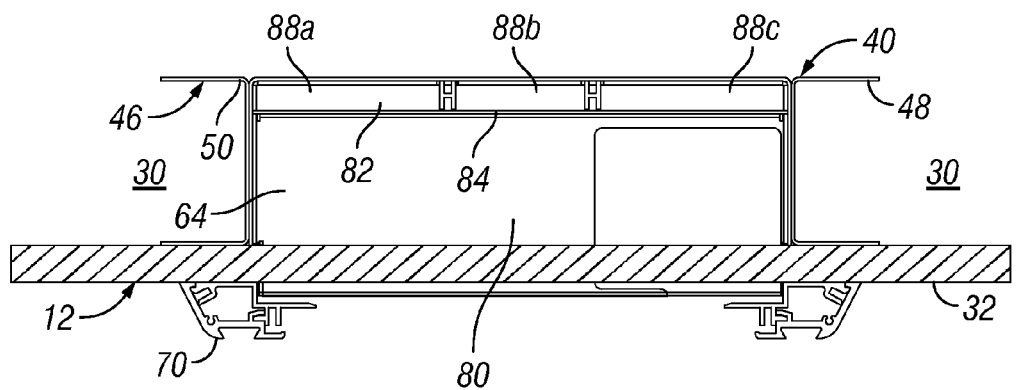
FIG. 6 is cross-sectional view of the unit take along line 6-6 of FIG. 3.
Figure 7:
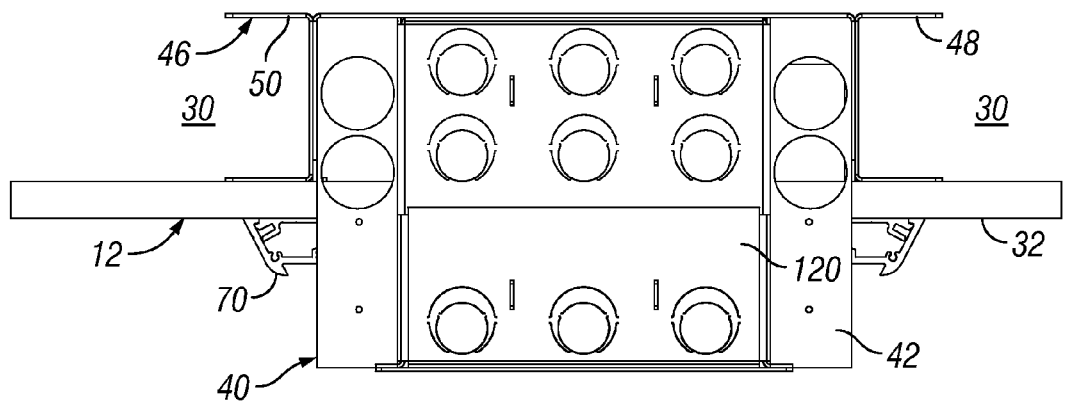
FIG. 7 is cross-sectional view of the unit take along line 7-7 of FIG. 3.

Referring still to FIGS. 2-8, the preferred structure for the housing 40 will be described. As indicated previously and as best seen in FIGS. 5-6, the housing 40 is generally tubular. More preferably, the housing 40 defines or is separated into a front chamber 80 and a rear chamber 82 both extending longitudinally in the housing. In the embodiment illustrated herein, the front and rear chambers 80 and 82 are formed by a partition or dividing panel 84 which divides the housing lengthwise across its widest dimension. In this way, the front chamber 80 is positioned to be adjacent the back 86 of the wallboard 32 when the unit 10 is installed. The rear chamber 82 is behind the front chamber 80 and is divided into a plurality of longitudinal raceways 88, such as the three raceways 88a, 88b, and 88c.

The unit 10 preferably includes a service conduit for each medical service outlet. For example, as seen best in FIG. 8, conduits such the pipes 90, 92 and 94 are included for the various gas outlets 62 (not seen in FIG. 8). These pipes 90, 92 and 94 run from the outlets 62 (FIG. 1) upwards in the front chamber 80 through the cabinet 60 and up through the upper end 42 of the housing 40.

Electrical service outlets are served by conduits, such as the electrical power wires 96 (FIG. 8). However, it will now be appreciated that the raceways 88a, 88b, and 88c in the rear chamber 82 replace the external electrical conduits that otherwise would carry such wiring. The dividing panel 84 is formed with a plurality of conduit openings designated generally at 100 (FIGS. 2 & 3) extending between each of the raceways 88 and the front chamber 80 inside the cabinet 60. Preferably, one opening 100 is positioned near each of the electrical service outlets 62, and including at least one conduit opening for each of the raceways 88a, 88b, and 88c.

It is advantageous to provide multiple punch outs 102 (FIGS. 2 & 3) in the panel 84 spaced along each of the raceways 88a, 88b, and 88c. Then, when assembling a unit 10 according to particular specifications, openings 100 can be created at the desired locations by simply removing the punch outs.

Like the gas conduits 90, 92, and 94, the electrical wires 96 extend up through the one of the raceways, such as the raceway 88a (FIG. 8). The wire 96 has a first end 106 that is connected to the electrical outlet 62. The intermediate portion 108 extends from the outlet 62 through a conduit opening (not seen in FIG. 8) and up through the raceway 88a above the cabinet until it terminates in a second end 110 at the upper end 42 of the housing 40. In this way, all the electrical service conduits, including power wires, data cables, and the like, are contained or isolated in the raceways 88 in the rear chamber 82.

With continued reference to FIGS. 1-5 and 7-8, the unit 10 in its preferred embodiment includes a junction box 120 mounted on the upper end 42 of the housing 40 so as to be above the ceiling 24 of the room 14 when the unit is installed in the wall 12. Even more preferably, the junction box 120 is positioned on the front of the housing 40 so that it extends forward of the wallboard 32 into the ceiling space 26. In this way, the wiring 96 will be accessible before and after the wallboard 32 is installed.

As best seen in FIG. 8, the junction box 120 usually will include a plurality of cells, such as the cells 122a, 122b, and 122c, there being one cell for each of the raceways 88a, 88b, and 88c, and being continuous therewith. Thus, when the junction box 120 is included, the second end 110 of the wire 96 will extend out into the cell 122a.

Having described the structure of the unit 10, the installation will be briefly summarized. After unpacking the unit 10, it is placed in the wall space 30 between two studs (not shown), and the vertical rails 48 and 50 of the frame 46 are secured to the studs. Next, the wallboard 32 is installed around the cover panel 68 and around the junction box 120 all the way up to deck 22 above the ceiling 24. This leaves the service conduits—the pipes 90, 92, and 94 and the wires 96—accessible in the ceiling space 26.

Now it will be appreciated that the modular medical services unit of the present invention provides several advantages. These main structural components can be manufactured and kept in inventory. Upon receipt of an order, the unit can be assembled quickly to the customer's specifications. The length is selected so that the upper end of the housing and the junction box will be above the ceiling. Thus, there is no need for the installation of the wallboard to be delayed until the electrical work or piping can be completed. The electrical conduits are all contained inside the housing in the rear raceways, eliminating the external electrical conduits.

The contents of co-pending application Ser. No. 10/100, 768, entitled "Modular In-Wall Medical Services Unit," filed Mar. 19, 2002, are incorporated herein by reference. In the event there is any inconsistency between the disclosure of the prior pending application and the disclosure herein, the disclosure herein shall control.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. The limits of the invention and the bounds of the patent protection are measured by and defined in the following claims.

What is claimed is:

1. A modular in-wall medical services unit for supplying a plurality of types of medical services to a room in a structure having a room defined horizontally by a floor beneath and a deck above, wherein the room includes a ceiling mounted a distance below the deck defining a ceiling space, wherein the room is defined vertically at least partially by a wall, the wall comprising a wall space defined on the inside of the room in part by wallboard, and wherein the plurality of types of medical services includes medical gas and electrical services, the unit comprising:

an elongate housing supportable inside the wall space behind the wallboard, the housing having an upper end that is sized to extend above the ceiling into the ceiling space;

wherein the housing defines a front chamber and a rear chamber, the front and rear chambers extending longitudinally in the housing, the front chamber positioned to be adjacent the back of the wallboard when the unit is installed, and wherein the rear chamber is behind and divided from the front chamber and is divided into a plurality of longitudinal raceways;

wherein the housing further defines a plurality of conduit openings, at least one conduit opening extending between each of the longitudinal raceways in the rear chamber and the front chamber;

a service cabinet supported in the housing so that it will be below the ceiling when the unit is installed;

a plurality of service outlets supported in the service cabinet, the plurality of service outlets including a plurality of electrical outlets and at least one medical gas outlet;

a plurality of service conduits including at least one medical gas conduit and a plurality of electrical wires, each wire having a first end, a second end, and an intermediate portion therebetween, the first end connected to one of the plurality of electrical outlets, the intermediate portion extending through one of the plurality of conduit openings and up through one of the plurality of raceways so that the second end extends out the upper end of the housing.

2. The modular in-wall medical services unit of claim 1 further comprising a frame for supporting the housing in the wall space.

3. The modular in-wall medical services unit of claim 2 wherein the frame comprises a pair of C-shaped rails attached to the sides of the housing, the rails having bottom ends adapted to rest on the floor supporting the housing.

4. The modular in-wall medical services unit of claim 1 wherein the service cabinet comprises a cover panel through which the service outlets are accessible.

5. The modular in-wall medical services unit of claim 4 wherein the cover panel is about flush with the wallboard when the unit is installed.

6. The modular in-wall medical services unit of claim 4 wherein the cover panel is slightly forward of the wallboard when the unit is installed.

7. The modular in-wall medical services unit of claim 4 wherein the cover panel is recessed slightly behind the wallboard when the unit is installed.

8. The modular in-wall medical services unit of claim 4 wherein the unit comprises a flange assembly to provide an interface between the cover panel and the surrounding wallboard when the unit is installed.

9. The modular in-wall medical services unit of claim 1 further comprising a junction box mounted on the upper end of the housing so as to be above the ceiling of the room when the unit is installed in the wall, the junction box including a plurality of cells, one cell for each one of the plurality of raceways and continuous therewith, and wherein the second end of the wire in each raceway extends into the continuous cell.

10. The modular in-wall medical services unit of claim 9 wherein the junction box is mounted on the front of the housing so as to extend forward of the wallboard when the unit is installed in the wall.

11. The modular in-wall medical services unit of claim 1 wherein the plurality of medical outlets include oxygen, air, and vacuum outlets.

12. The modular in-wall medical services unit of claim 11 wherein the plurality of electrical wires include wires for power and data transmission.

13. The modular in-wall medical services unit of claim 1 wherein the plurality of electrical wires include wires for power and data transmission.

14. The modular in-wall medical services unit of claim 1 wherein the plurality of raceways comprises three raceways.

15. The modular in-wall medical services unit of claim 1 wherein the housing is generally tubular.

16. The modular in-wall medical services unit of claim 1 wherein further comprising a dividing panel that divides the front chamber from the rear chamber and wherein the plurality of conduit openings extend through the dividing panel.

* * * * *